(12) United States Patent
Helberg et al.

(10) Patent No.: US 11,199,888 B1
(45) Date of Patent: Dec. 14, 2021

(54) SYSTEM AND METHOD FOR MITIGATING LIQUID DAMAGE TO AN INFORMATION HANDLING SYSTEM

(71) Applicant: Dell Products L.P., Round Rock, TX (US)

(72) Inventors: Christopher M. Helberg, Austin, TX (US); Philip Joseph Grossmann, Austin, TX (US); Timothy Ray Graham, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/889,476

(22) Filed: Jun. 1, 2020

(51) Int. Cl.
*G06F 1/26* (2006.01)
*G05B 19/042* (2006.01)

(52) U.S. Cl.
CPC .............. *G06F 1/26* (2013.01); *G05B 19/042* (2013.01); *G05B 2219/2614* (2013.01)

(58) Field of Classification Search
CPC .. G06F 1/26; G05B 19/042; G05B 2219/2614
USPC .................. 713/300, 320, 330, 340
See application file for complete search history.

(56) References Cited

U.S. PATENT DOCUMENTS

| 2011/0221373 A1* | 9/2011 | Tong | G06F 11/0754 318/490 |
| 2014/0253150 A1* | 9/2014 | Menzel | G01R 27/2605 324/664 |

* cited by examiner

*Primary Examiner* — Michael J Brown
(74) *Attorney, Agent, or Firm* — Baker Botts L.L.P.

(57) ABSTRACT

Methods, systems, and computer programs encoded on computer storage medium, for detecting, across a resistive sense circuit proximate to a venting system of an IHS, a first voltage at a first time, wherein the first voltage includes a state-steady voltage and a nominal voltage; comparing the first voltage to a voltage threshold, and determining that the first voltage is less than or equal to the voltage threshold and in response, maintaining a power state of the IHS; detecting, across the resistive sense circuit, a second voltage at a second time after the first time, wherein the second voltage includes the steady-state voltage and a low-voltage; comparing the second voltage to the voltage threshold, and determining that the second voltage is greater than the threshold voltage, and in response preparing a computer-implemented response to mitigate damage to the IHS from liquid contacting one or more computing components of the IHS.

11 Claims, 5 Drawing Sheets

SYSTEM AND METHOD FOR MITIGATING LIQUID DAMAGE TO AN INFORMATION HANDLING SYSTEM

BACKGROUND

Field of the Disclosure

The disclosure relates generally to an information handling system, and in particular, mitigation of liquid damage to the information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A user accidentally spilling liquid onto an information handling system, especially users with kids, is not an uncommon occurrence. Often a user may not know the optimal way to prevent catastrophic damage to their information handling system occurring from such spilled liquids. If the spilled liquid situation of the information handling system is not properly handled in a timely manner the chance of preventing a catastrophic event is significantly increased.

SUMMARY

Innovative aspects of the subject matter described in this specification may be embodied in a method including detecting, across a resistive sense circuit proximate to a venting system of an information handling system (IHS), a first voltage at a first time, wherein the first voltage includes a state-steady voltage and a nominal voltage; comparing the first voltage to a voltage threshold, and determining that the first voltage is less than or equal to the voltage threshold; in response to determining that the first voltage is less than or equal to the voltage threshold, maintaining a power state of the IHS; detecting, across the resistive sense circuit, a second voltage at a second time after the first time, wherein the second voltage includes the steady-state voltage and a low-voltage; comparing the second voltage to the voltage threshold, and determining that the second voltage is greater than the threshold voltage; and in response to determining that the second voltage is greater than the voltage threshold, preparing a computer-implemented response to mitigate damage to the IHS from liquid contacting one or more computing components of the IHS.

Other embodiments of these aspects include corresponding systems, apparatus, and computer programs, configured to perform the actions of the methods, encoded on computer storage devices.

These and other embodiments may each optionally include one or more of the following features. For instance, preparing the computer-implemented response further includes providing a notification for display by the IHS, the notification providing one or more user-selectable options to mitigate the damage to the IHS from the liquid contacting the computing components of the IHS. In response to providing the user-selectable options, receiving a user input indicating to manually change the power state of the IHS to be powered-down to mitigate the damage to the IHS from the liquid contacting the computing components of the IHS. Preparing the computer-implemented response further includes automatically changing the power state of the IHS to a powered-down power state to mitigate the damage to the IHS from the liquid contacting the computing components of the IHS. Preparing the computer-implemented response further includes changing a power state of a portion of the IHS to be a powered-down power state to mitigate the damage to the IHS from the liquid contacting the computing components of the IHS. Changing the power state of the portion of the IHS to be the powered-down power state further includes maintaining a power state of a differing portion of the IHS including the resistive sense circuit to a powered-on power state. Changing the power state of the portion of the IHS to the powered-down power state further includes maintaining the powered-down state of the IHS for a predetermined time interval and preventing changing the power state of the portion of the IHS to the powered-on power state for the predetermined time interval.

Innovative aspects of the subject matter described in this specification may be embodied in an information handling system including a venting system; a resistive sense circuit coupled to the venting system; a memory media storing instructions; a processor in communication with the memory media to execute the instructions to perform operations comprising: detecting, across the resistive sense circuit, a first voltage at a first time, wherein the first voltage includes a state-steady voltage and a nominal voltage; comparing the first voltage to a voltage threshold, and determining that the first voltage is less than or equal to the voltage threshold; in response to determining that the first voltage is less than or equal to the voltage threshold, maintaining a power state of the IHS; detecting, across the resistive sense circuit, a second voltage at a second time after the first time, wherein the second voltage includes the steady-state voltage and a low-voltage; comparing the second voltage to the voltage threshold, and determining that the second voltage is greater than the threshold voltage; and in response to determining that the second voltage is greater than the voltage threshold, preparing a computer-implemented response to mitigate damage to the IHS from liquid contacting one or more computing components of the IHS.

Other embodiments of these aspects include corresponding methods, apparatus, and computer programs, configured to perform the actions of the methods, encoded on computer storage devices.

These and other embodiments may each optionally include one or more of the following features. For instance, preparing the computer-implemented response further includes providing a notification for display by the IHS, the notification providing one or more user-selectable options to mitigate the damage to the IHS from the liquid contacting the computing components of the IHS. In response to providing the user-selectable options, the operations further include receiving a user input indicating to manually change the power state of the IHS to be powered-down to mitigate the damage to the IHS from the liquid contacting the computing components of the IHS. Preparing the computer-implemented response further includes automatically changing the power state of the IHS to a powered-down power state to mitigate the damage to the IHS from the liquid contacting the computing components of the IHS. Preparing the computer-implemented response further includes changing a power state of a portion of the IHS to be a powered-down power state to mitigate the damage to the IHS from the liquid contacting the computing components of the IHS. Changing the power state of the portion of the IHS to be the powered-down power state further includes maintaining a power state of a differing portion of the IHS including the resistive sense circuit to a powered-on power state. Changing the power state of the portion of the IHS to the powered-down power state further includes maintaining the powered-down state of the IHS for a predetermined time interval and preventing changing the power state of the portion of the IHS to the powered-on power state for the predetermined time interval.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-5 wherein like numbers are used to indicate like and corresponding parts.

Figure 1:
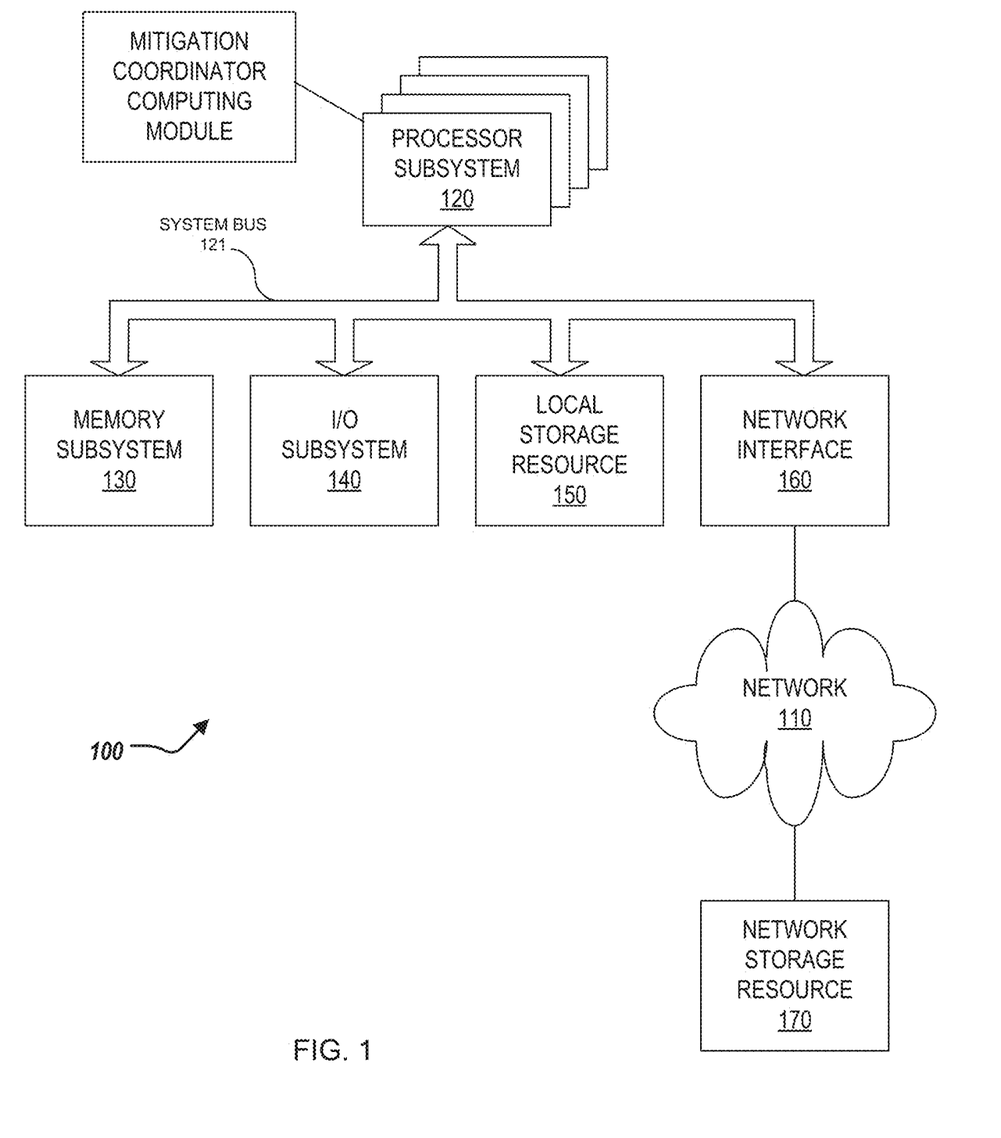
FIG. 1 is a block diagram of selected elements of an embodiment of an information handling system.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The information handling system 100 can include a mitigation coordinator computing module 190. For example, the mitigation coordinator computing module 190 can be included by the processor subsystem 120, and/or in communication with the processor subsystem 120. The mitigation coordinator computing module 190 is described further herein.

Figure 2:
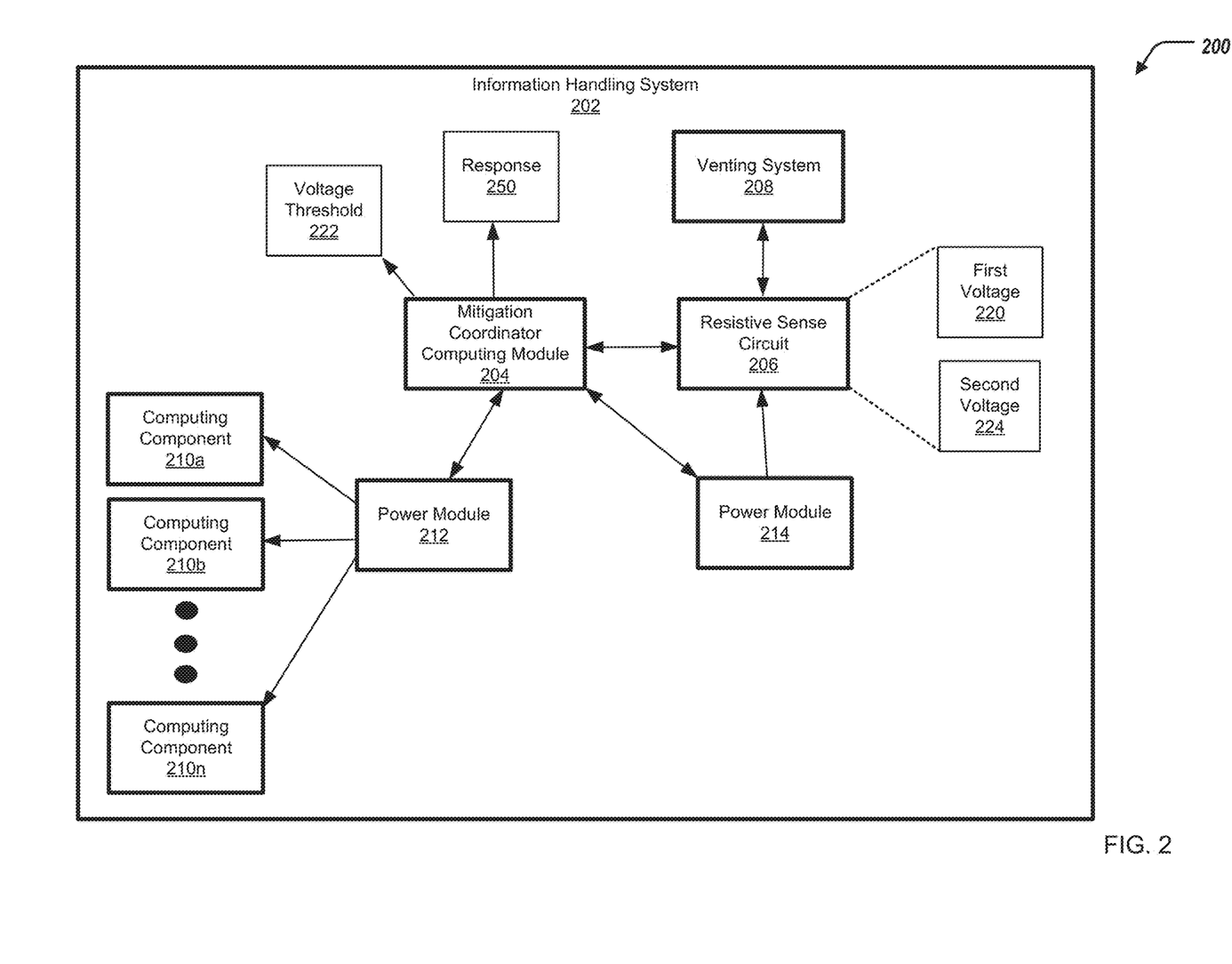
FIG. 2 illustrates a block diagram of the information handling system for mitigating liquid damage to an information handling system.

Turning to FIG. 2, FIG. 2 illustrates a computing environment 200 including an information handling system 202. The information handling system 202 can include a mitigation coordinator computing module 204, a resistive sense circuit 206, a venting system 208, computing components 210a, 210b, . . . , 210n (collectively referred to as computing components 210), a power module 212, and a power module 214. The mitigation coordinator computing module 204 can be the same, or substantially similar to, the mitigation coordinator computing module 190 of FIG. 1. The mitigation coordinator computing module 204 can be in communication with the resistive sense circuit 206, and the power modules 212, 214. The resistive sense circuit 206 can be in communication with the venting system 208. The power module 212 can provide power to the computing components 210; and the power module 214 can provide power to the resistive sense circuit 206. The information handling system 202 can be similar to the information handling system 100 of FIG. 1.

In short, the information handling system 202, and in particular, the mitigation coordinator computing module 204, can detect when/if a liquid medium (e.g., water, coffee, or any other spilled liquid) is introduced on/near the information handling system 202. The liquid medium can be detected by the resistive sense circuit 206 that is coupled proximate to the venting system 208 (e.g., is adhered to a fan housing or molded into the fan housing of the venting system 208). The mitigation coordinator computing module 204 can apply a voltage to the resistive sense circuit 206, and periodically measure the voltage across the resistive sense circuit 206 to determine whether the resistive sense circuit has encountered the liquid medium. When the liquid medium comes into contact with the venting system 208 and/or the fan housing of the venting system 208 and ultimately the resistive sense circuit 206 proximate the venting system 208, a voltage between wires of the resistive sense circuit 206 can be increased, and a signal can be generated to initiate a pre-programmed response. The pre-programmed response can be to power-down the information handling system 202, or provide a prompt to the user that gives the user options upon detection of the liquid medium spill, as discussed further herein. When the resistive sense circuit 206 is dry (e.g., when the resistive sense circuit 206 has not encountered the liquid medium), there is no additional energy that is generated between the wires of the resistive sense circuit 206, as discussed further herein.

Figure 3:
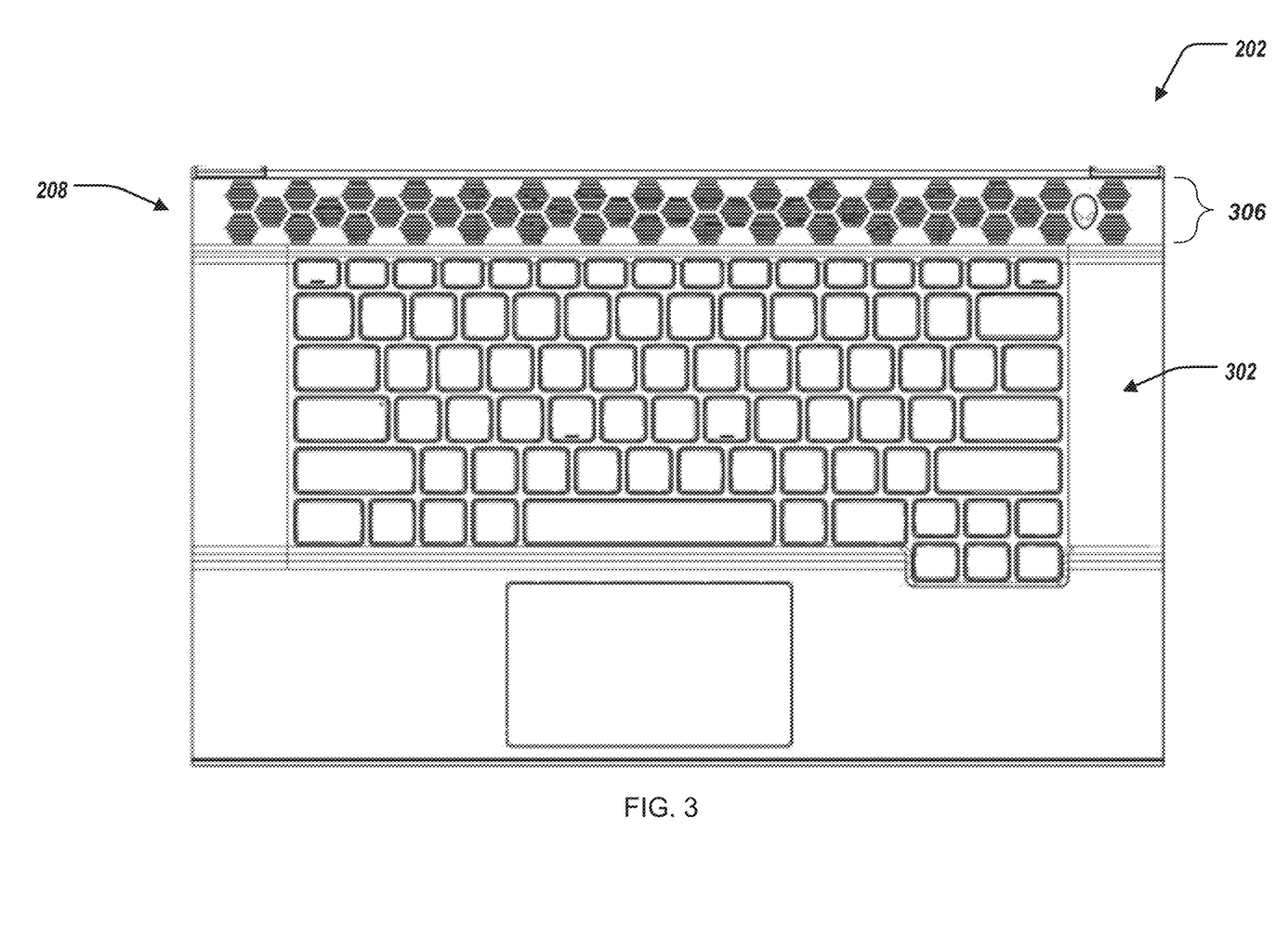
FIG. 3 illustrates an example of a venting system included by the information handling system.

FIG. 3 illustrates an example of the venting system 208 included by the information handling system 202 (note only a portion of the information handling system 202 is shown, the portion including the computing components 210). The venting system 208 can be positioned proximate to a top surface 302 of the information handling system 202; however, the venting system 208 can be positioned on any surface of the information handling system 202. The venting system 208 can include a fan (or blower) (not shown). The venting system 208 can provide cooling to the information handling system 202 by way of vents 306. The vents 306 can provide an access point to internals of the information handling system 202 (e.g., the computing components 210) and/or the fan, and specifically, undesirable contact with a liquid medium.

Figure 4:
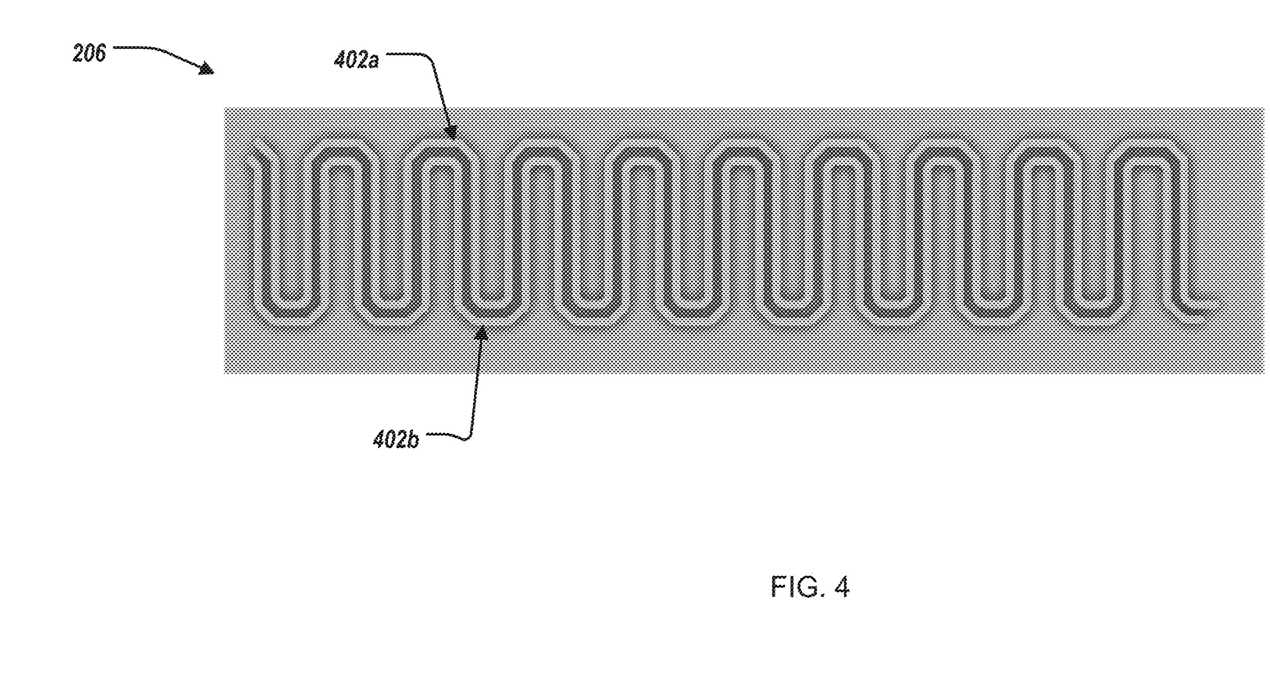
FIG. 4 illustrates an example of a resistive sense circuit included by the information handling system.

FIG. 4 illustrates an example of the resistive sense circuit 206. The resistive sense circuit 206 can include a first wire (or electrode) 402a and a second wire (or electrode) 402b (collectively referred to as wires 402). In some examples, the wires 402 can be closely-spaced parallel lines that may be routed in a serpentine manner along a sensing region—e.g., proximate to the venting system 208. In some examples, the wires 402 can be positioned on any surface of the information handling system 202 proximate to the venting system 208. In some examples, the resistive sense circuit 206 is a flexible cable strip that is adhered to a surface; or co-molded with the surface/venting system 208. The resistive sense circuit 206 can include any pattern, including a more densely serpentine pattern. In some examples, the wires 402 are gold-plated. In some examples, the first wire 402 can provide power to the fan (not shown)—e.g., 12 volts. The resistive sense circuit 206 can be formed into any shape depending on the application desired, and can function using different processes (e.g., FR4, LDS, In-Molding).

Referring back to FIG. 2, in some implementations, the mitigation coordinator computing module 204 can detect, across the resistive sense circuit 206, a first voltage 220 at a first time. The first voltage 220 can include a steady-state voltage and a nominal voltage. The steady-state voltage is the voltage associated with the first wire 402a—e.g., the voltage associated with the fan 304 (approximately 12 volts). The nominal voltage is the voltage associated with the second wire 402b—e.g., the voltage when the second wire 402b is not currently conductive (0 volts). That is, when the second wire 402b is dry, the second wire 402b consumes zero, or substantially zero, energy.

The mitigation coordinator computing module 204 compares the first voltage 220 to a voltage threshold 222. The mitigation coordinator computing module 204 can determine that the first voltage 220 is less than or equal to the voltage threshold 222. For example, the first voltage 220 can be 12 V and the voltage threshold 222 can be 12 V. In response to determining that the first voltage 220 is less than or equal to the voltage threshold 222, the (power) state of the information handling system 202 is maintained. That is, the mitigation coordinator computing module 204 does not take further action, or adjust any state, including the power state, of the information handling system 202.

In some examples, the mitigation coordinator computing module 204 applies a voltage to the resistive sense circuit 206, and periodically measures the voltage across the resistive sense circuit 206. When the resistive sense circuit 206 is dry (e.g., when the resistive sense circuit 206 has not encountered a liquid medium), there is no additional energy coupled to the first wire 402a from the second wire 402b.

The mitigation coordinator computing module 204 can detect, across the resistive sense circuit 206, a second voltage 224 at a second time. The second voltage 220 can include a steady-state voltage and a low-voltage. The steady-state voltage is the voltage associated with the first wire 402a. The low-voltage is the voltage associated with the second wire 402b. That is, when the second wire 402b is wet, the second wire 402b conducts energy—e.g., a low voltage (0.1 or 0.5 volts).

The mitigation coordinator computing module 204 can compare the second voltage 224 to the voltage threshold 222. The mitigation coordinator computing module 204 can determine that the second voltage 224 is greater than the voltage threshold 222. For example, the second voltage 224 can be 12.5 V and the voltage threshold 222 can be 12V. In response to determining that the second voltage 222 is greater than the voltage threshold 222, the mitigation coordinator computing module 204 can prepare a computer-implemented response 250 to mitigate damage to the information handling system 202 from the liquid contacting the computing components 210.

For example, as the liquid accumulates on the resistive sense circuit 206, the energy coupling between the wires 402 increases. That is, the second wire 402b can be conductive above the nominal (zero) voltage (e.g., when the second wire 402b is dry—under normal working conditions). Thus, the second voltage 224 across the resistive sense circuit 206 can be greater than the voltage threshold 222—the second voltage 224 including the steady-state voltage of the first wire 402a and the low-voltage of the second wire 402b. When the energy coupling between the wires 402 increases past the voltage threshold 222, the mitigation coordinator computing module 204 can determine that a liquid medium has encountered/entered the venting system 208. Furthermore, when the energy coupling between the wires 402 increases past the voltage threshold 222, the mitigation coordinator computing module 204 can prepare the computer-implemented response to mitigate any damage to the information handling system 202, including the computing components 210, that can be caused by the liquid medium entering the venting system 208.

In some examples, preparing the computer-implemented response 250 can include the mitigation coordinator computing module 204 providing a notification for display by the information handing system 202 (e.g., on a display of the information handling system 202). The notification can provide one or more user-selectable options to mitigate the damage to the information handling system 202 from the liquid medium from contacting the computing components 210. For example, the notification can include a text display of "fluid detected leaking into system" and provide the user with options to mitigate damage such as shutting down the system, or other.

In some examples, in response to providing the user-selectable options, the mitigation coordinator computing module 204 can receive user input indicating to manually change the power state of the information handling system 202 to be powered-down to mitigate the damage to the information handling system 202 from the liquid medium contacting the computing components 210. When the information handling system 202 is in a powered-down state, further damage to the computing components 210 is minimized and/or prevented. For example, the mitigation coordinator computing module 204 can disable all available power sources (e.g., power modules 212, 214) including DC-IN, Type C ports, the battery, and any other potential power sources.

In some examples, preparing the computer-implemented response 250 can include the mitigation coordinator computing module 204 automatically changing the power state of the information handling system 202 to the powered-down power state to mitigate the damage to the information handling system 202 from contacting the computing components 210. That is, the mitigation coordinator computing module 204 automatically places the information handling system 202 in a powered-down state without user interaction. When the information handling system 202 is in a powered-down state, further damage to the computing components 210 is minimized and/or prevented. For example, the mitigation coordinator computing module 204 can disable all available power sources (e.g., power modules 212, 214) including DC-IN, Type C ports, the battery, and any other potential power sources.

In some examples, preparing the computer-implemented response 250 can include the mitigation coordinator computing module 204 changing a power state of a portion of the information handling system 202 to a powered-down power state to mitigate the damage to the information handling system 202 from contacting the computing components 210. Specifically, the mitigation coordinator computing module 204 can adjust the power state of the power module 212 such that the power state of the computing components 210 are in a powered down-state. Additionally, the mitigation coordinator computing module 204, when changing a power state of a portion of the information handling system 202 to a powered-down power, can further maintain a power state of a differing portion of the information handling system 202 including the resistive sense circuit 206 to a powered-on power state. Specifically, the mitigation coordinator computing module 204 can maintain the powered-on power state of the power module 214 such that the power state of the resistive sense circuit 206 remains powered on when the power state of the power module 212 and the computing components 210 are powered down. For example, by maintaining the power state of the resistive sense circuit 206 and the mitigation coordinator computing module 204 powered-on, the mitigation coordinator computing module 204 can perform continuous monitoring of the voltage across the resistive sense circuit 206.

In some examples, when the mitigation coordinator computing module 204 detects that the voltage across the resistive sense circuit 206 is below the voltage threshold, the mitigation coordinator computing module 204 can change the power state of the power module 212 and the computing components 210 to the powered-on state. That is, after powering down the power module 212 and the computing components 210 when the second voltage 224 is greater than the voltage threshold 222, the mitigation coordinator computing module 204 can detect that such voltage across the resistive sense circuit 206 is below the voltage threshold 222, and returns the power module 212 and the computing components 210 to normal operating conditions (e.g., powered on).

In some examples, the mitigation coordinator computing module 204 changes the power state of the portion of the information handling system 202 to the powered state for a predetermined time interval and prevent changing the power state of the portion of the information handling system 202 to the powered-on power state for the predetermined time interval. Specifically, the mitigation coordinator computing module 204 changes the power state of the power module 212 and the computing components 210 for a predetermined time interval (e.g., 5 mins, 15 mins, 30 mins, 60 mins, etc.) to the powered down power stated and prevents changing the power state of the power module 212 and the computing components 210 to the powered-one power stated for the predetermined time interval.

In some examples, the resistive sense circuit 206 is adjustable/tunable. Specifically, the pitch/spacing of the resistive sense circuit 206 can be adjusted/fine-turned to match a type and/or volume of the liquid medium (e.g., based on an anticipated liquid medium that may encounter the venting system 208). Thus, when the pitch/spacing of the resistive sense circuit 206 is denser, the resistive sense circuit 206 is able to more accurately detect the liquid medium at lower volumes (e.g., finer tuned).

In some examples, the resistive sense circuit 206 and the threshold voltage 222 can be based on a user of the information handling system 202 and the product needs/desires of the information handling system 202. For example, when the user of the information handling system 202 is a child, the number of resistive sense circuits 206 can be increased (e.g., for durability concerns).

Figure 5:
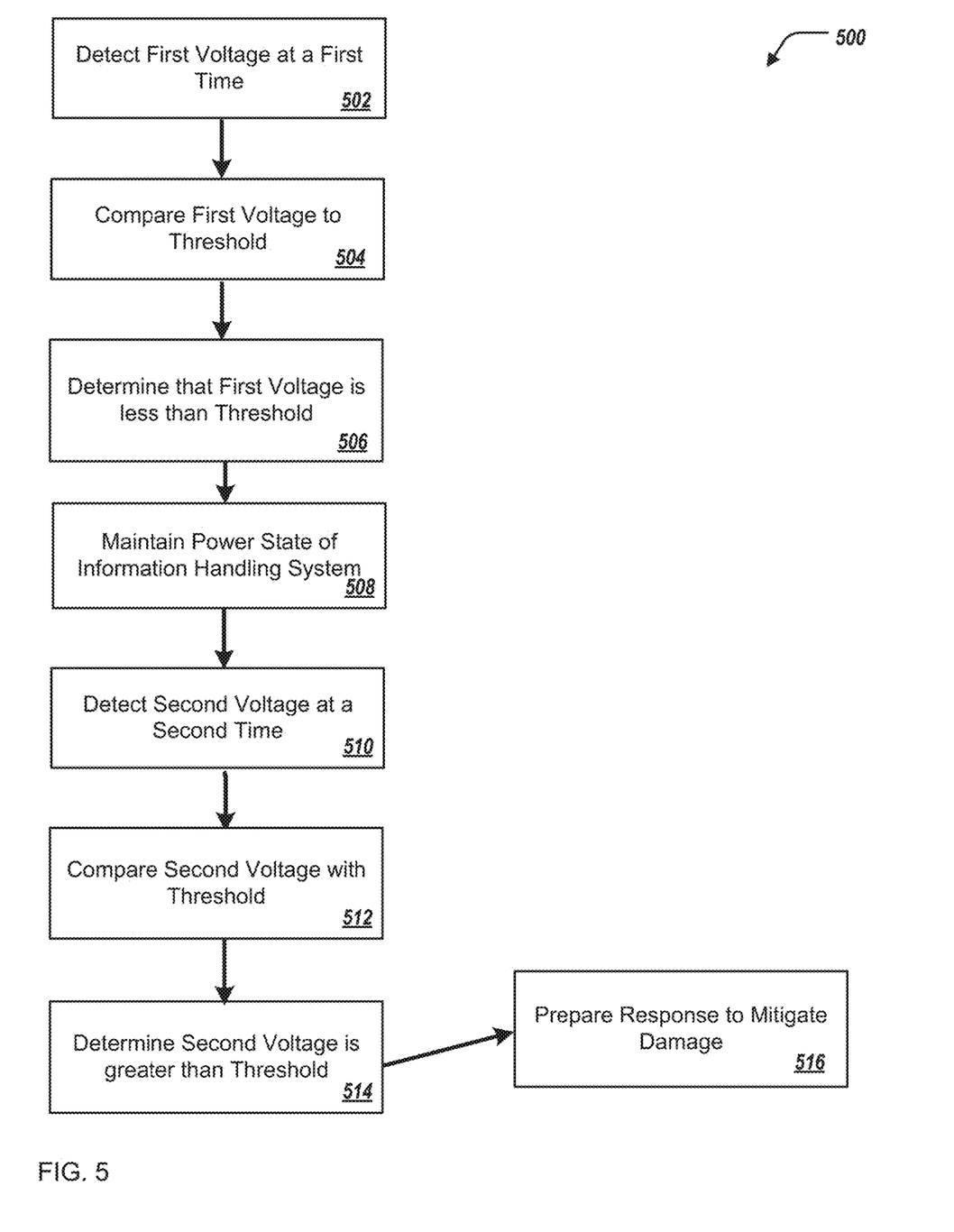
FIG. 5 illustrates a method for mitigating liquid damage to the information handling system.

FIG. 5 illustrates a flowchart depicting selected elements of an embodiment of a method 500 for mitigating liquid damage to the information handling system 202. The method 500 may be performed by the information handling system 100, the computing environment 200, the information handling system 202, the mitigation coordinator computing module 204, and/or the resistive sense circuit 206 with reference to FIGS. 1-4. It is noted that certain operations described in method 500 may be optional or may be rearranged in different embodiments.

The mitigation coordinator computing module 204 can detect, across the resistive sense circuit 206, the first voltage 220 at the first time (502). The first voltage 220 can include a steady-state voltage and a nominal voltage. The mitigation coordinator computing module 204 compares the first voltage 220 to a voltage threshold 222 (504). The mitigation coordinator computing module 204 can determine that the first voltage 220 is less than or equal to the voltage threshold 222 (506). In response to determining that the first voltage 220 is less than or equal to the voltage threshold 222, the (power) state of the information handling system 202 is maintained (508). The mitigation coordinator computing module 204 can detect, across the resistive sense circuit 206, a second voltage 224 at a second time (510). The second voltage 224 can include a steady-state voltage and a low-voltage. The mitigation coordinator computing module 204 can compare the second voltage 224 to the voltage threshold 222 (512). The mitigation coordinator computing module 204 can determine that the second voltage 224 is greater than the voltage threshold 222 (514). In response to determining that the second voltage 222 is greater than the voltage threshold 222, the mitigation coordinator computing module 204 can prepare a computer-implemented response 250 to mitigate damage to the information handling system 202 from the liquid contacting the computing components 210 (516).

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method, comprising:
   detecting, across a resistive sense circuit proximate to a venting system of an information handling system (IHS), a first voltage at a first time, wherein the first voltage includes a state-steady voltage and a nominal voltage;
   comparing the first voltage to a voltage threshold, and determining that the first voltage is less than or equal to the voltage threshold;
   in response to determining that the first voltage is less than or equal to the voltage threshold, maintaining a power state of the IHS;
   detecting, across the resistive sense circuit, a second voltage at a second time after the first time, wherein the second voltage includes the steady-state voltage and a low-voltage;
   comparing the second voltage to the voltage threshold, and determining that the second voltage is greater than the threshold voltage; and
   in response to determining that the second voltage is greater than the voltage threshold, preparing a computer-implemented response to mitigate damage to the IHS from liquid contacting one or more computing components of the IHS, including changing a power state of a first portion of the IHS to be a powered-down power state to mitigate the damage to the IHS from the liquid contacting the computing components of the IHS, while concurrently maintaining a power state of a second portion of the IHS that includes the resistive sense circuit to a powered-on power state such that continuous monitoring of voltage across the resistive sense circuit is performed.

2. The computer-implemented method of claim 1, wherein preparing the computer-implemented response further includes providing a notification for display by the IHS, the notification providing one or more user-selectable options to mitigate the damage to the IHS from the liquid contacting the computing components of the IHS.

3. The computer-implemented method of claim 2, wherein in response to providing the user-selectable options, receiving a user input indicating to manually change the power state of the IHS to be powered-down to mitigate the damage to the IHS from the liquid contacting the computing components of the IHS.

4. The computer-implemented method of claim 1, wherein changing the power state of the portion of the IHS to the powered-down power state further includes maintaining the powered-down state of the IHS for a predetermined time interval and preventing changing the power state of the portion of the IHS to the powered-on power state for the predetermined time interval.

5. An information handling system (IHS), comprising:
   a venting system;
   a resistive sense circuit coupled to the venting system;
   a non-transitory memory media storing instructions;
   a processor in communication with the memory media to execute the instructions to perform operations comprising:
      detecting, across the resistive sense circuit, a first voltage at a first time, wherein the first voltage includes a state-steady voltage and a nominal voltage;
      comparing the first voltage to a voltage threshold, and determining that the first voltage is less than or equal to the voltage threshold;
      in response to determining that the first voltage is less than or equal to the voltage threshold, maintaining a power state of the IHS;
      detecting, across the resistive sense circuit, a second voltage at a second time after the first time, wherein the second voltage includes the steady-state voltage and a low-voltage;
      comparing the second voltage to the voltage threshold, and determining that the second voltage is greater than the threshold voltage; and
      in response to determining that the second voltage is greater than the voltage threshold, preparing a computer-implemented response to mitigate damage to the IHS from liquid contacting one or more computing components of the IHS, including changing a power state of a first portion of the IHS to be a powered-down power state to mitigate the damage to the IHS from the liquid contacting the computing components of the IHS, while concurrently maintaining a power state of a second portion of the IHS that includes the resistive sense circuit to a powered-on power state such that continuous monitoring of voltage across the resistive sense circuit is performed.

6. The information handling system of claim 5, wherein preparing the computer-implemented response further includes providing a notification for display by the IHS, the notification providing one or more user-selectable options to mitigate the damage to the IHS from the liquid contacting the computing components of the IHS.

7. The information handling system of claim 6, wherein in response to providing the user-selectable options, the operations further include receiving a user input indicating to manually change the power state of the IHS to be powered-down to mitigate the damage to the IHS from the liquid contacting the computing components of the IHS.

8. The information handling system of claim 5, wherein changing the power state of the portion of the IHS to the powered-down power state further includes maintaining the powered-down state of the IHS for a predetermined time interval and preventing changing the power state of the portion of the IHS to the powered-on power state for the predetermined time interval.

9. A non-transitory computer-readable medium storing software comprising instructions executable by one or more computers which, upon such execution, cause the one or more computers to perform operations comprising:

detecting, across a resistive sense circuit proximate to a venting system of an information handling system (IHS), a first voltage at a first time, wherein the first voltage includes a state-steady voltage and a nominal voltage;

comparing the first voltage to a voltage threshold, and determining that the first voltage is less than or equal to the voltage threshold;

in response to determining that the first voltage is less than or equal to the voltage threshold, maintaining a power state of the IHS;

detecting, across the resistive sense circuit, a second voltage at a second time after the first time, wherein the second voltage includes the steady-state voltage and a low-voltage;

comparing the second voltage to the voltage threshold, and determining that the second voltage is greater than the threshold voltage; and in response to determining that the second voltage is greater than the voltage threshold, preparing a computer-implemented response to mitigate damage to the IHS from liquid contacting one or more computing components of the IHS, including changing a power state of a first portion of the IHS to be a powered-down power state to mitigate the damage to the IHS from the liquid contacting the computing components of the IHS, while concurrently maintaining a power state of a second portion of the IHS that includes the resistive sense circuit to a powered-on power state such that continuous monitoring of voltage across the resistive sense circuit is performed.

10. The computer-readable medium of claim 9, wherein preparing the computer-implemented response further includes providing a notification for display by the IHS, the notification providing one or more user-selectable options to mitigate the damage to the IHS from the liquid contacting the computing components of the IHS.

11. The computer-readable medium of claim 10, wherein in response to providing the user-selectable options, the operations further include receiving a user input indicating to manually change the power state of the IHS to be powered-down to mitigate the damage to the IHS from the liquid contacting the computing components of the IHS.

\* \* \* \* \*